(12) United States Patent
Sue et al.

(10) Patent No.: US 8,102,612 B2
(45) Date of Patent: Jan. 24, 2012

(54) LENS DRIVING DEVICE

(75) Inventors: Takeshi Sue, Nagano (JP); Daisuke Higuchi, Nagano (JP); Yuichi Takei, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/742,274

(22) PCT Filed: Nov. 13, 2008

(86) PCT No.: PCT/JP2008/003315
§ 371 (c)(1),
(2), (4) Date: May 11, 2010

(87) PCT Pub. No.: WO2009/063641
PCT Pub. Date: May 22, 2009

(65) Prior Publication Data
US 2010/0271717 A1 Oct. 28, 2010

(30) Foreign Application Priority Data
Nov. 14, 2007 (JP) .................................. 2007-295360

(51) Int. Cl.
*G02B 7/02* (2006.01)
*G02B 15/14* (2006.01)
(52) U.S. Cl. ......... 359/824; 359/811; 359/822; 359/694
(58) Field of Classification Search .......... 359/694–704, 359/811–824
See application file for complete search history.

(56) References Cited

U.S. PATENT DOCUMENTS

| | | | | |
|---|---|---|---|---|
| 5,974,264 | A * | 10/1999 | Manabe et al. | .................... 396/6 |
| 7,724,449 | B2 * | 5/2010 | Takei et al. | .................... 359/704 |
| 7,936,523 | B2 * | 5/2011 | Higuchi | ......................... 359/814 |
| 2006/0203627 | A1 | 9/2006 | Osaka | |
| 2007/0053082 | A1 | 3/2007 | Sue et al. | |
| 2010/0149668 | A1 * | 6/2010 | Wade et al. | .................... 359/824 |

FOREIGN PATENT DOCUMENTS

| | | |
|---|---|---|
| JP | 9-120743 A | 5/1997 |
| JP | 10-161209 A | 6/1998 |
| JP | 2005-165058 A | 6/2005 |
| JP | 2006-251728 A | 9/2006 |
| JP | 2007-94364 A | 4/2007 |
| JP | 2007-134772 A | 5/2007 |
| JP | 2007-148354 A | 6/2007 |
| JP | 2007-226011 A | 9/2007 |
| WO | 2007/026830 A1 | 3/2007 |
| WO | 2007/097413 A1 | 8/2007 |

OTHER PUBLICATIONS

International Search Report for International application No. PCT/JP2008/003315 with English translation mailed Jan. 27, 2009.

* cited by examiner

*Primary Examiner* — Mohammed Hasan
(74) *Attorney, Agent, or Firm* — Cantor Colburn LLP (57) ABSTRACT

A lens driving device for use with a lens to photograph or image an object to be photographed or imaged may include a moving member holding the lens and made movable in the direction of an optical axis, and a supporting member for supporting the moving member through a spring member, wherein the lens is displaced and driven in the optical axis direction thereby to focus the image of the object. The supporting member may include a yoke having a cover portion having an entrance window for introducing the reflected light from the object into the lens, and a case portion for covering the outer circumference of the moving member. The cover portion and the case portion are formed integrally with each other.

7 Claims, 8 Drawing Sheets

LENS DRIVING DEVICE

CROSS REFERENCE TO RELATED APPLICATIONS

This is a U.S. national stage of application No. PCT/JP2008/003315, filed on Nov. 13, 2008. Priority under 35 U.S.C. §119(a) and 35 U.S.C. §365(b) is claimed from Japanese Application No. 2007-295360, filed Nov. 14, 2007, the disclosure of which is also incorporated herein by reference.

FIELD OF THE INVENTION

The present application relates to a lens drive device in which a lens is driven to move in an optical axis direction for forming an image of an object to be photographed or imaged.

BACKGROUND

As cell phones with cameras have become popular in recent years, chances photographing or imaging various objects to be photographed by using the cell phone have increased. For example, there is a case that an object such as a friend or landscape which is apart from a lens of a camera to some extent is photographed (normal photographing) and, alternatively, there is a case that an object such as a timetable for bus or petals of a flower at a position near the lens of the camera is photographed (close-up photographing).

In the close-up photographing (macro-photographing), a lens position of a camera is required to locate at a slightly nearer position on an object side than a lens position at the time of normal photographing. Therefore, this type of photographing lens system is provided with a drive mechanism for driving a lens to move in the optical axis direction. The drive mechanism is driven by changing a state of a switch to move a lens in the optical axis direction (see, for example, Patent Reference 1).

A lens drive device which is disclosed in Patent Reference 1 includes a movable lens body, a drive mechanism for moving the movable lens body in an optical axis direction, a fixed body (yoke) which movably supports the movable lens body in the optical axis direction, and a restriction means (flat spring) which restricts movement of the movable lens body. Further, the drive mechanism includes a magnet and a coil. In the structure as described above, while an electric current is supplied to the coil to generate an electromagnetic force, a restriction force against the electromagnetic force is generated by the restriction means and magnitudes of both the restriction force and the electromagnetic force are adjusted to stop the movable lens body at a desired position.

[Patent Reference 1] Japanese Patent Laid-Open No. 2007-94364

However, when the yoke and the flat spring are to be assembled, the yoke and the flat spring are required to be positioned in the optical axis direction and the radial direction. Specifically, for example, a jig which is structured so that a circular cylinder having substantially the same diameter as a lens-barrel (or lens) is stood on a pedestal is used for assembling. For example, a cover, a yoke, flat springs, a magnet and the like are required to fix in order by using the jig while positioning in the optical axis direction and the radial direction. In this manner, in the manufacturing steps for the lens drive device, positioning work is required many times due to influence of component accuracy and assembling accuracy of adhesion, fixing by welding and the like and thus working efficiency is not satisfactory. Especially, since the yoke which determines the outer shape dimension is conventionally formed by a bending work, its dimensional tolerance is difficult to make smaller and thus rattling is easily occurred in the radial direction. In order to prevent this problem, it is required that, at the time of assembling, fixing is performed while positioning in the radial direction is performed.

In view of the problem described above, at least an embodiment of the present invention provides a lens drive device which is capable of reducing the number of times of a positioning work and is capable of improving working efficiency.

SUMMARY

In order to solve the problem described above, at least an embodiment of the present invention provides as follows.

(1) A lens drive device for use with a lens to photograph an object to be photographed, the lens drive device comprising:
a movable body which holds the lens and which is movable in an optical axis direction;
a support body which supports the movable body through a spring member;
a magnet for moving the movable body in the optical axis direction; and
a coil which is attached to the movable body for moving the movable body in the optical axis direction;
wherein the support body comprises a yoke to which the magnet is fixed for moving the movable body in the optical axis direction;
wherein the yoke is formed by a drawing work so that the yoke comprises:
a cover part which is formed with an incident window for taking reflected light from the object to be photographed into the lens and which is exposed as a front face of the lens drive device; and
a case part which covers a periphery of the movable body and which is exposed as a side face of the lens drive device;
wherein the cover part and the case part are formed in an integral manner, and
wherein the lens is driven to move in the optical axis direction for forming an image of the object to be photographed.

According to this embodiment, in a lens drive device including a movable body and a support body and, in which a lens is driven to move in the optical axis direction for forming an image of the object to be photographed, the lens drive device includes a magnet, a coil which is attached to the movable body, and a yoke to which the magnet is fixed for moving the movable body in the optical axis direction. In the lens drive device, the yoke is formed by a drawing work so that the yoke comprises a cover part which is formed with an incident window for taking a reflected light from an object to be photographed into the lens and which is exposed as a front face of the lens drive device, and a case part which covers a periphery of the movable body and which is exposed as a side face of the lens drive device, and the yoke structures the front face and the side face of the lens drive device as the support body.

Therefore, for example, when the spring member and the movable body are to be accommodated into the yoke formed in a roughly box-like shape comprised of the cover part and the case part, positioning in the optical axis direction can be performed by the cover part. Further, positioning in the radial direction (direction perpendicular to the optical axis direction) can be performed by the case part. As a result, the conventional jig for positioning is not required. Since positioning work is simultaneously performed at the same time when accommodating work is performed as described above, the number of times of positioning work can be reduced and working efficiency can be improved. Further, the cover part and the case part are structured of one member which is formed by a drawing work. Therefore, in comparison with a conventional bending work, the dimensional tolerance can be restrained smaller and thus the cover part and the case part with a high degree of working accuracy can be easily formed. In addition, a part of magnetic path can be structured while magnetic flux from the magnet is prevented from leaking out the outside of the cover part and the case part and thus magnetic resistance can be reduced and a thrust force for the moveable body can be improved.

(2) The lens drive device wherein a spacer for mounting the spring member, the spring member, and the magnet which is fixed to the case part are disposed in an inner side of the cover part so as to be superposed on each other in this order from a cover part side.

According to this embodiment, a spacer for mounting the spring member, the spring member, the magnet which is fixed to the case part are disposed in an inner side of the above-mentioned cover part so as to be superposed on each other in this order from a cover part side. Therefore, the spacer and the spring member are capable of being positioned in the optical axis direction by the cover part and the magnet and, as a result, working efficiency can be improved.

(3) The lens drive device wherein the spacer is abutted with an inner face of the case part to determine a position of the spacer in a direction perpendicular to the optical axis direction, and a position of the spring member in the direction perpendicular to the optical axis direction is determined with respect to the yoke through the spacer.

According to this embodiment, the spacer is abutted with an inner face of the case part to determine a position of the spacer in a direction perpendicular to the optical axis direction. As a result, a jig for positioning is not required to be used as a conventional case. Since positioning work is simultaneously performed at the same time when accommodating work is performed, the number of times of positioning work can be reduced and, as a result, working efficiency can be improved.

(4) The lens drive device wherein a face on a cover part side of the spacer is abutted with an inner face of the cover part to determine a position of the spacer in the optical axis direction, and a position of the magnet in the optical axis direction is determined with respect to the yoke through the spacer and the spring member.

According to this embodiment, a face on a cover part side of the spacer is abutted with an inner face of the case part to determine a position of the spacer in a direction perpendicular to the optical axis direction, and a face on a cover part side of the spacer is abutted with an inner face of the cover part to determine a position of the spacer in the optical axis direction. As a result, a jig for positioning is not required to use as a conventional case. Since positioning work is simultaneously performed at the same time when accommodating work is performed, the number of times of positioning work can be reduced and, as a result, working efficiency can be improved.

(5) The lens drive device wherein an external shape of the yoke is formed in a roughly rectangular shape having four corner portions, and the magnet is formed with two side faces which are respectively abutted with two inner side faces formed on the corner portion of the yoke, and the two side faces of the magnet are respectively abutted with two inner side faces of the yoke to determine a position of the magnet in a direction perpendicular to the optical axis direction on the corner portion of the yoke.

According to this embodiment, an external shape of the yoke is formed in a roughly rectangular shape having four corner portions, and the magnet is formed with two side faces which are respectively abutted with two inner side faces formed on the corner portion of the yoke, and the two side faces of the magnet are respectively abutted with two inner side faces of the yoke to determine a position of the magnet in a direction perpendicular to the optical axis direction on the corner portion of the yoke. Therefore, positioning work is simultaneously performed at the same time when accommodating work is performed, the number of times of positioning work can be reduced and, as a result, working efficiency can be improved.

(6) The lens drive device wherein a face on a cover part side of the spacer is abutted with an inner face of the cover part to determine a position of the spacer in the optical axis direction, and the spacer is abutted with an inner face of the case part to determine a position of the spacer in a direction perpendicular to the optical axis direction, and a position of the magnet in the optical axis direction is determined with respect to the yoke through the spacer, and a position of the spring member in the direction perpendicular to the optical axis direction is determined with respect to the yoke through the spacer.

According to this embodiment, a face on a cover part side of the spacer is abutted with an inner face of the cover part to determine a position of the spacer in the optical axis direction, and the spacer is abutted with an inner face of the case part to determine a position of the spacer in a direction perpendicular to the optical axis direction. As a result, a jig for positioning is not required to be used as a conventional case. Since positioning work is simultaneously performed when accommodating work is performed, the number of times of positioning work can be reduced and, as a result, working efficiency can be improved.

(7) The lens drive device wherein a portion around the incident window of the cover part is protruded to an outer side in the optical axis direction to form a stepped part.

According to this embodiment, the above-mentioned cover part is formed so that a portion around the incident window of the cover part is protruded to an outer side in the optical axis direction to form a stepped part. Therefore, a space made by the stepped part may be, for example, structured to provide a function as a spacer whose thickness is larger than a moving amount of the spring member. Therefore, in this case, the spacer is not required to use and, as a result, the lens drive device can be made thinner or its weight can be reduced.

According to at least an embodiment of a lens drive device in accordance with the present invention, the number of times of positioning work can be reduced and, as a result, working efficiency can be improved. Further, the cover part and the case part are integrally formed with each other as a yoke by a drawing work whose working accuracy is higher than a conventional bending work and thus the working efficiency can be enhanced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3(*a*) and 3(*b*) are perspective views showing a yoke in the lens drive device.

DETAILED DESCRIPTION OF PREFERRED EMBODIMENTS

Embodiments of the present invention will be described below with reference to the accompanying drawings.

[Mechanical Structure]

Figure 1:
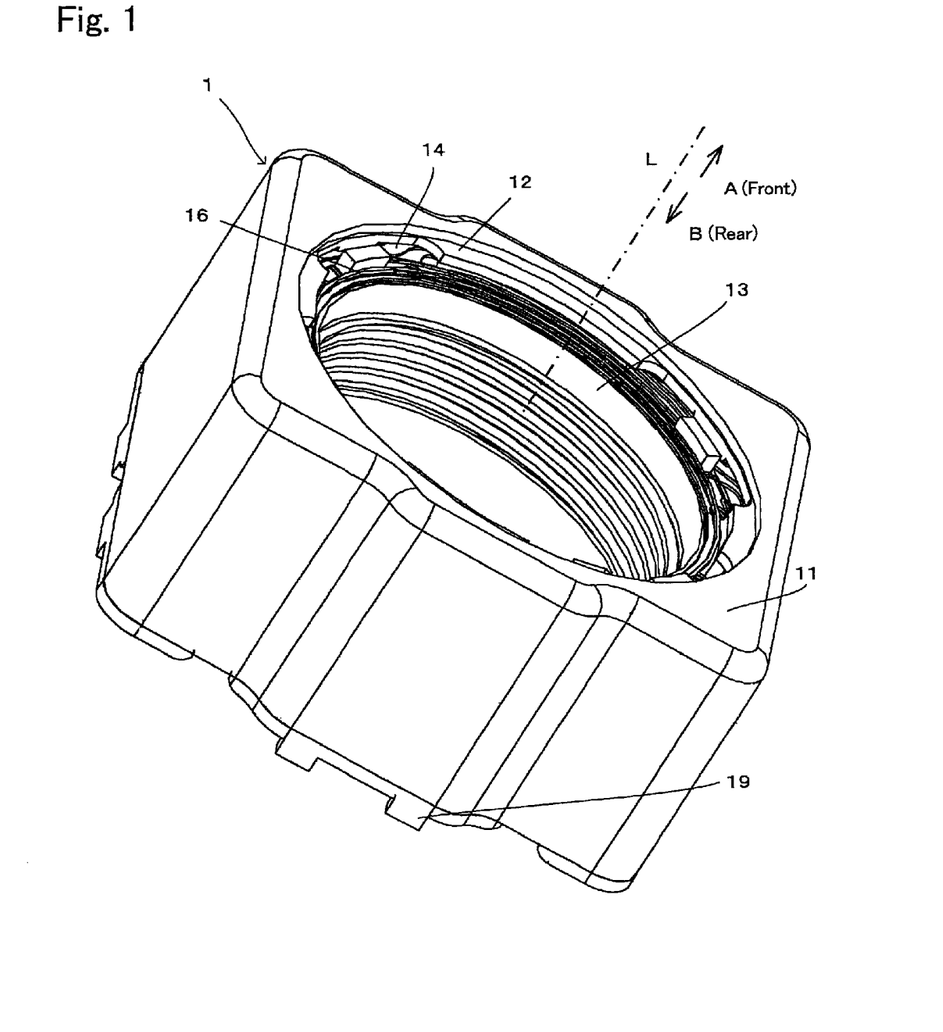
FIG. 1 is a perspective outward appearance view showing a lens drive device in accordance with an embodiment of the present invention.
Figure 2:
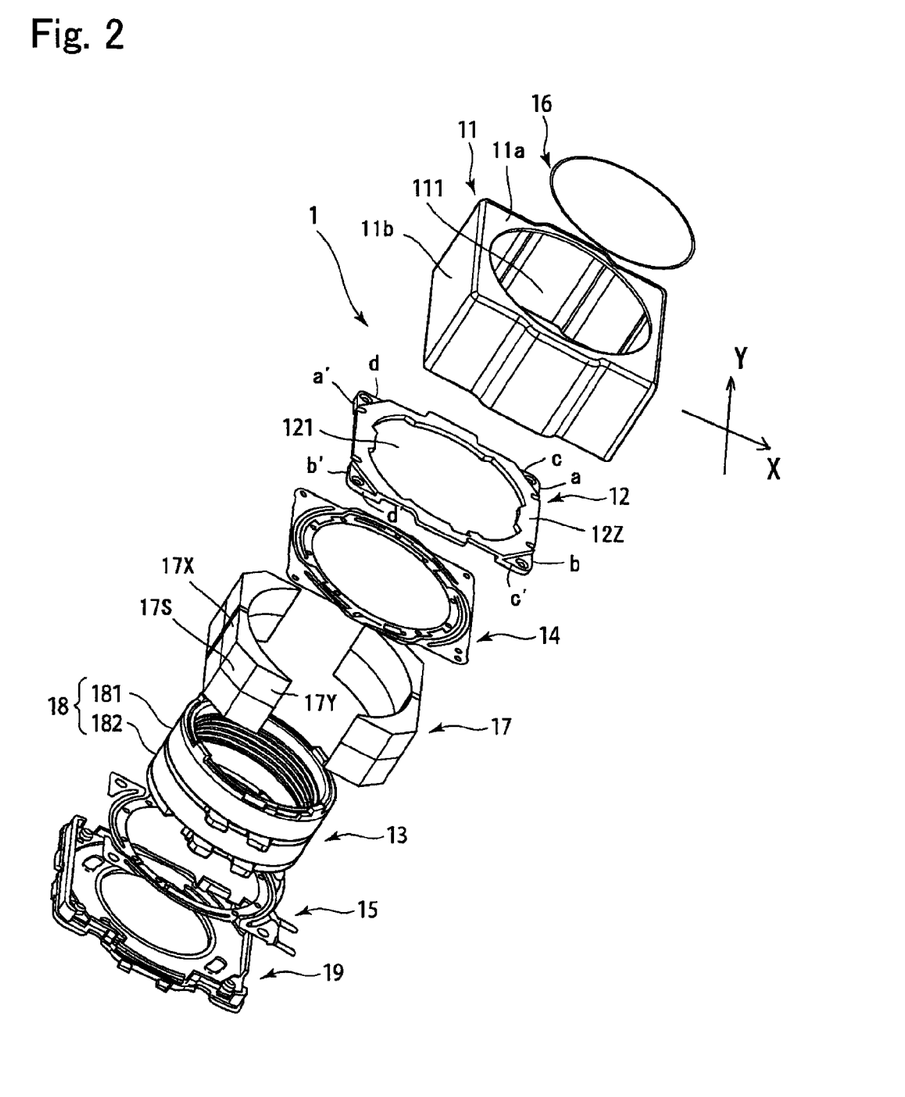
FIG. 2 is an exploded perspective view showing a mechanical structure of a lens drive device in accordance with an embodiment of the present invention.

FIG. 1 is a perspective outward appearance view showing a lens drive device 1 in accordance with an embodiment of the present invention. FIG. 2 is an exploded perspective view showing a mechanical structure of a lens drive device 1 in accordance with an embodiment of the present invention.

In FIGS. 1 and 2, the lens drive device 1 includes a yoke 11, a spacer 12, a sleeve 13, a first plate spring 14, a second plate spring 15, a wire spring 16, a magnet 17, a coil 18 (a first coil 18a and a second coil 18b) and a holder 19. A lens is driven to move in a direction of an optical axis "L" of the lens to form an image of an object to be photographed or imaged.

In FIGS. 1 and 2, a lens barrel into which the lens is assembled is not shown. The lens drive device 1 makes the sleeve 13 formed in a cylindrical shape move along the optical axis "L" direction in both directions, i.e., an "A"-direction (front side) approaching to an object to be photographed (imaging object) and a "B"-direction (rear side) approaching to an opposite side to the object to be photographed (image side) (see FIG. 1). Further, the sleeve 13 which holds the lens barrel (not shown) into which one or plural lenses are assembled is structured so as to be movable in the direction of the optical axis "L" together with a wire spring 16 and the like, which correspond to an example of the "movable body". Further, the yoke 11, the spacer 12, the holder 19 and the like correspond to an example of the "support body" which supports the sleeve 13 and the like so as to be movable in the direction of the optical axis "L" through the first plate spring 14 and the second plate spring 15. Further, the sleeve 13 and the like are driven in the direction of the optical axis "L" by the coil 18 and the magnet 17.

The yoke 11 is exposed as a front face and side faces of the lens drive device 1 and the yoke 11 is provided with a cover part 11a which is formed with a circular incident window 111 in its center for taking a reflected light from an object to be photographed or imaged into the lens (see FIG. 2). Further, the yoke 11 is provided with a case part 11b which covers an outer periphery of the sleeve 13 (see FIG. 2). The cover part 11a and the case part 11b are formed in an integral manner. When the yoke 11 structured as described above is used, positioning of the spacer 12 and the first flat spring 14 can be performed easily. Details of the positioning will be described below in the paragraphs of [Positioning with Yoke].

The spacer 12 is attached to the yoke 11 and its center is formed with a circular incident window 121 for taking a reflected light from an object to be photographed into the lens. The holder 19 holds an imaging element (not shown) on an image side.

The coil 18 is structured of the first coil 181 and the second coil 182, which are disposed in two layers in the direction of the optical axis "L", and each is formed in a circular ring shape. The first coil 181 and the second coil 182 are wound around an outer peripheral face of the sleeve 13 so as to have a predetermined space between them. Further, eight magnets 17 are disposed so as to be superposed on each other in two layers in the optical axis direction. The magnets 17 on the front side of the respective magnets 17 are faced to the first coil 181 on an outer peripheral side and the magnets 17 on the rear side are faced to the second coil 182 on an outer peripheral side and, as shown in FIG. 2 and the like, the eight magnets 17 are fixed to four corner portions on an inner peripheral face of the yoke 11 whose outer shape is formed in a roughly rectangular shape.

In this embodiment, each of the magnets 17 is magnetized so that the inside face and the outside face are magnetized to be different from each other. For example, four magnets 17 disposed on the front side are magnetized so that their inside faces are magnetized to be an "N"-pole and their outside faces are magnetized to be an "S"-pole, and four magnets 17 disposed on the rear side are magnetized so that their inside faces are magnetized to be an "S"-pole and their outside faces are magnetized to be an "N"-pole.

The first plate spring 14 and the second plate spring 15 are formed of a metal thin plate and their thicknesses in the direction of the optical axis "L" is set to be the same as each other. Further, as shown in FIG. 2, the first plate spring 14 is attached to a front end face in the optical axis direction of the sleeve 13, and the second plate spring 15 is attached to a rear end face in the optical axis direction of the sleeve 13. In this embodiment, as shown in FIG. 2, although notational symbols are not shown, each of the first plate spring 14 and the second plate spring 15 includes a circular arc-shaped sleeve side mounting part, a spacer side mounting part which is attached to the spacer 12, and an arm part which is formed between the sleeve side mounting part and the spacer side mounting part for restricting movement (urging) in the optical axis direction of the sleeve 13. The respective mounting parts are fixed to the spacer 12 or the holder 19 by using welding, adhesion or both of them.

Further, the second plate spring 15 is structured of two spring pieces which are electrically separated from each other and serve as means for supplying an electric current to the coil 18 from an external power supply. A winding start of the coil 18 is electrically connected to one of the two spring pieces and its winding end is electrically connected to the other of the two spring pieces.

A case part 11b of the yoke 11 is set to be larger than a dimension in the optical axis direction of a region where the first coil 181 and the second coil 182 are disposed and larger than a dimension in the optical axis direction of the magnet 17. Therefore, leakage flux is capable of being reduced which is generated from a magnetic path structured between the front side magnets 17 and the first coil 181 and from a magnetic path structured between the rear side magnets 17 and the second coil 182. As a result, linearity between a moving amount of the sleeve 13 and an electric current supplied to the first coil 181 and the second coil 182 can be improved.

The lens drive device 1 is provided with a circular ring shaped wire spring 16. The wire spring 16 applies an urging force in the direction of the optical axis "L" to the sleeve 13 due to a magnetic attractive force acting between the magnets 17 and the wire spring 16. Therefore, the movable body (sleeve 13 and the like) is prevented from being displaced by its own weight at a not-energized time of the coil and, as a result, the movable body (sleeve 13 and the like) is capable of maintaining a desired posture. In addition, impact resistance is improved.

In the lens drive device 1 in accordance with an embodiment of the present invention, a characteristic structure is the shape of the yoke 11 and the spacer 12 and the first flat spring 14 are positioned by the yoke 11. The yoke 11 and positioning of the yoke 11 will be described below with reference to FIGS. 3(a) through 7.

[Positioning with Yoke]

Figure 3A:
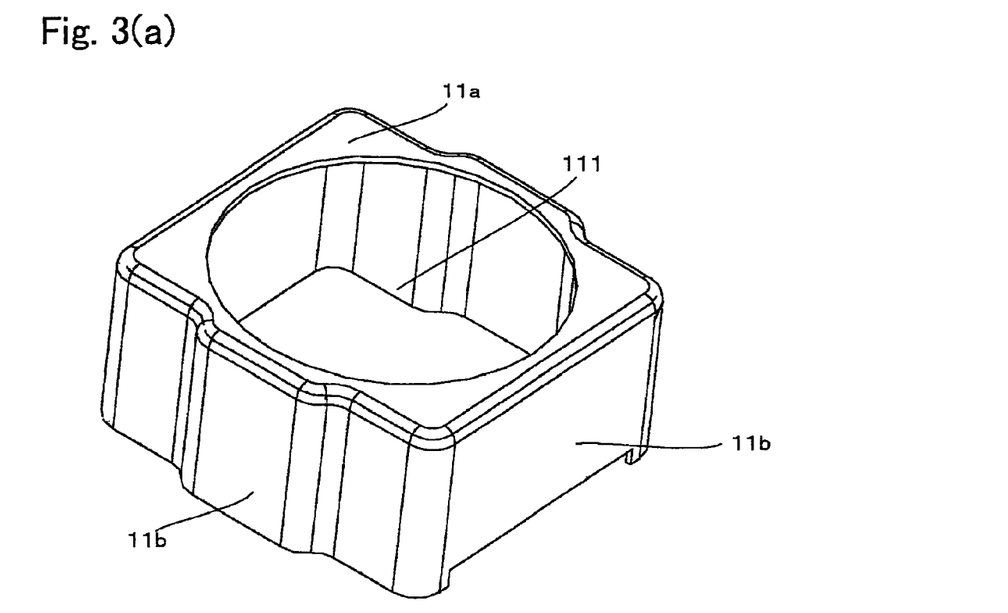
Figure 3B:
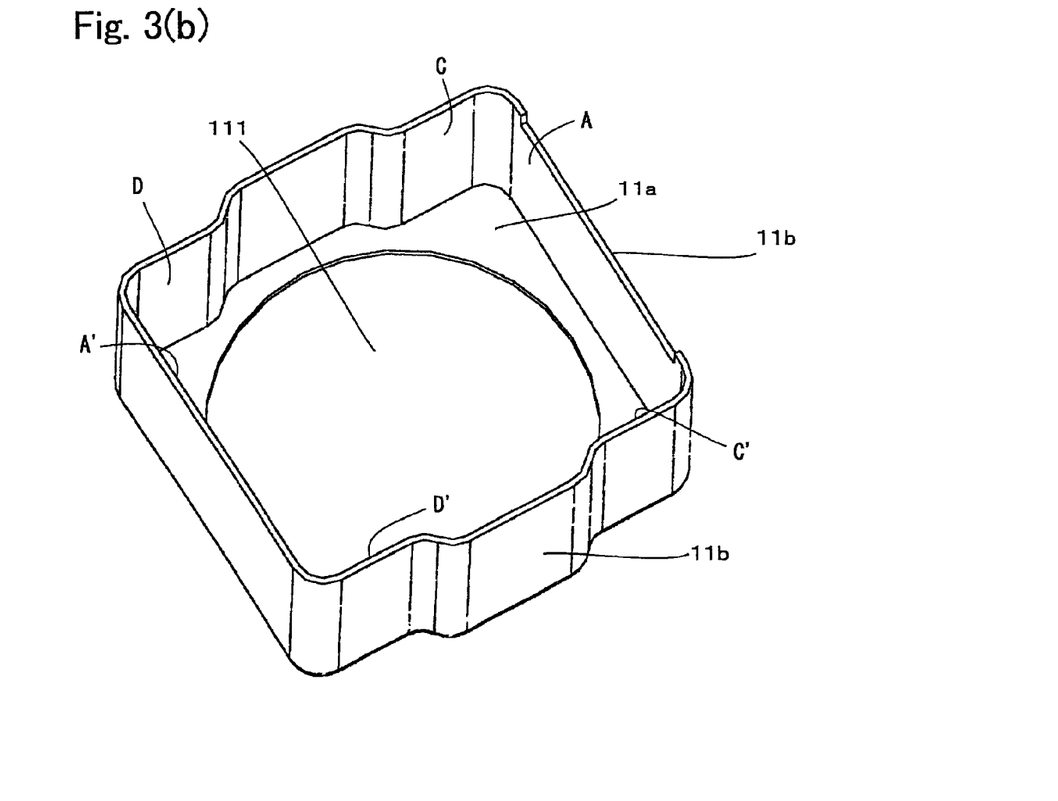

FIGS. 3(a) and 3(b) are perspective views showing the yoke 11 in the lens drive device 1. Especially, FIG. 3(a) is a perspective view showing the yoke 11 which is viewed from the front side and FIG. 3(b) is a perspective view showing the yoke 11 which is viewed from the rear side.

Figure 4:
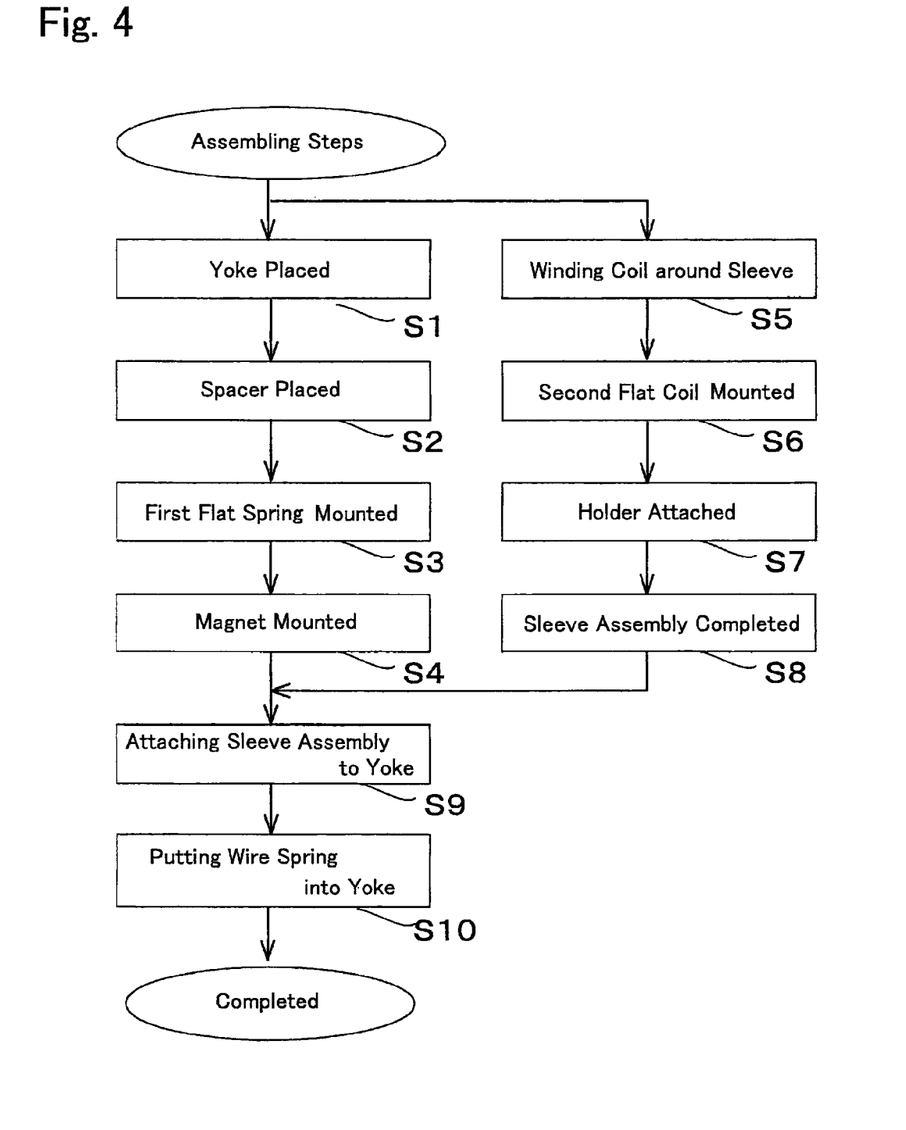
FIG. 4 is a flow chart for explaining schematic assembling steps for the lens drive device.

As shown in FIGS. 3(a) and 3(b) and FIG. 4, the yoke 11 in this embodiment is structured of the cover part 11a having an incident window 111 and the case part 11b which corresponds to a side face and covers an outer periphery of the sleeve 13 (or magnet 17). The cover part 11a and the case part 11b are made of a ferromagnetic plate (magnetic body) or the like such as a steel plate, and they are formed by a drawing work. Therefore, easiness of working can be enhanced. In addition, a drawing work is capable of enhancing working accuracy in comparison with a conventional bending work. For example, a bending work is performed with accuracy in a dimensional tolerance of the order of 1/10. However, in a drawing work in this embodiment, working is performed in a dimensional tolerance of the order of 1/100. Further, since the cover part 11a is made of a magnetic body, the cover part 11a is capable of structuring a part of the magnetic path and thus a magnetic resistance can be made smaller and a thrust force for the sleeve 13 can be enhanced. However, the present invention is not limited to this embodiment and other materials and working methods may be adopted.

Figure 5:
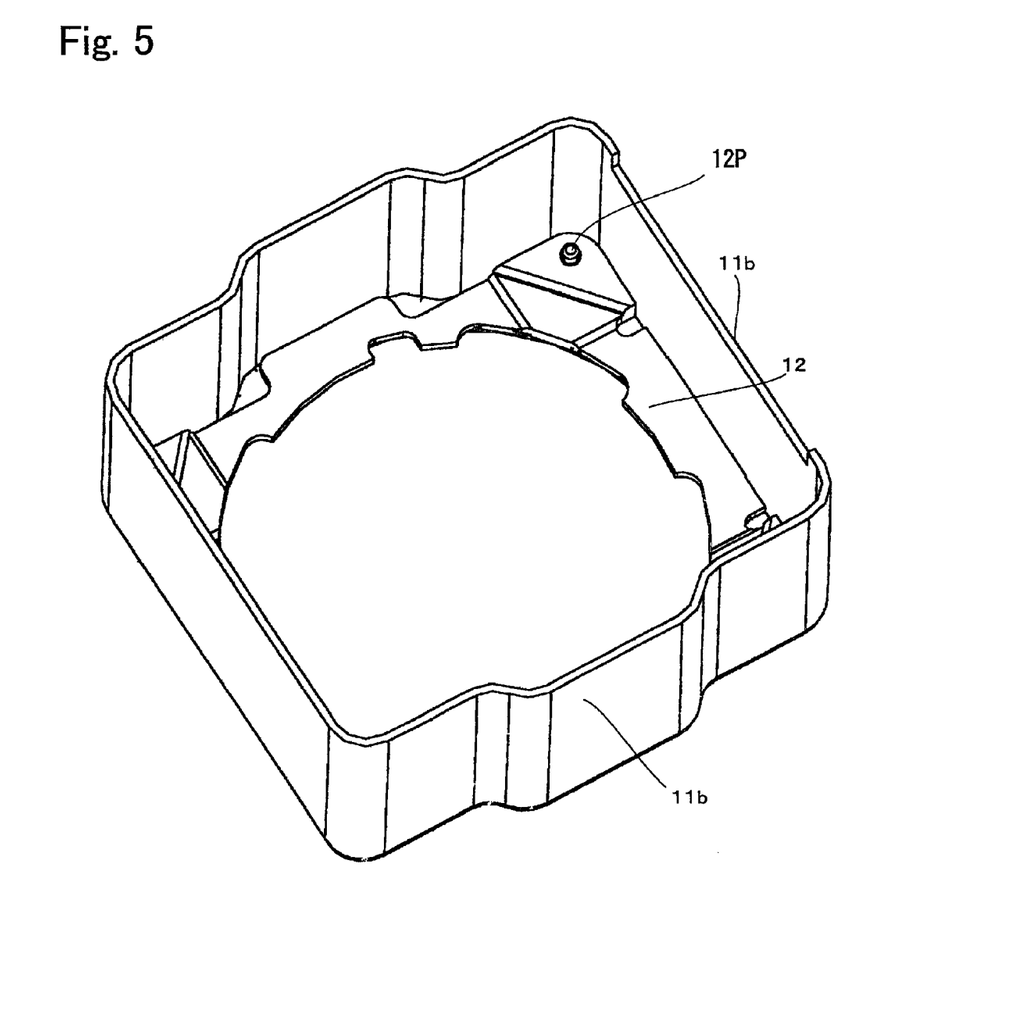
FIG. 5 is a perspective view showing a state where a spacer has been placed on the yoke shown in FIGS. 3(a) and 3(b).
Figure 6:
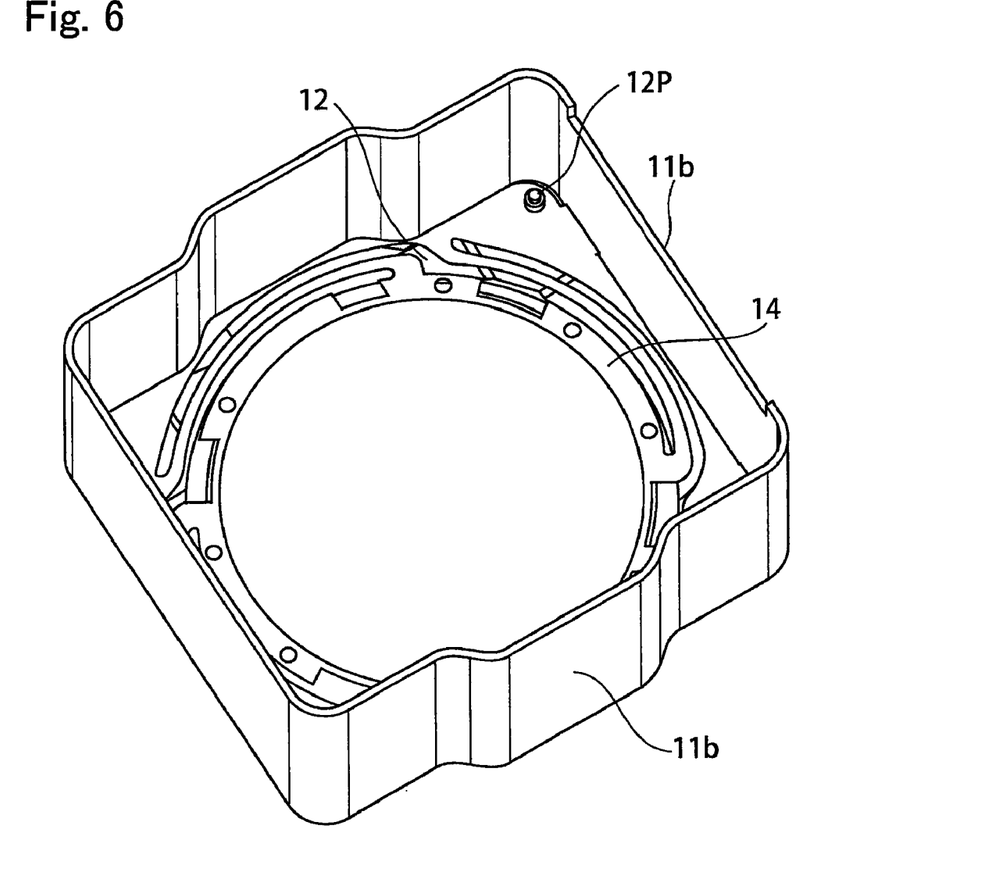
FIG. 6 is a perspective view showing a state where a spacer and a first flat spring have been placed on the yoke shown in FIGS. 3(a) and 3(b).
Figure 7:
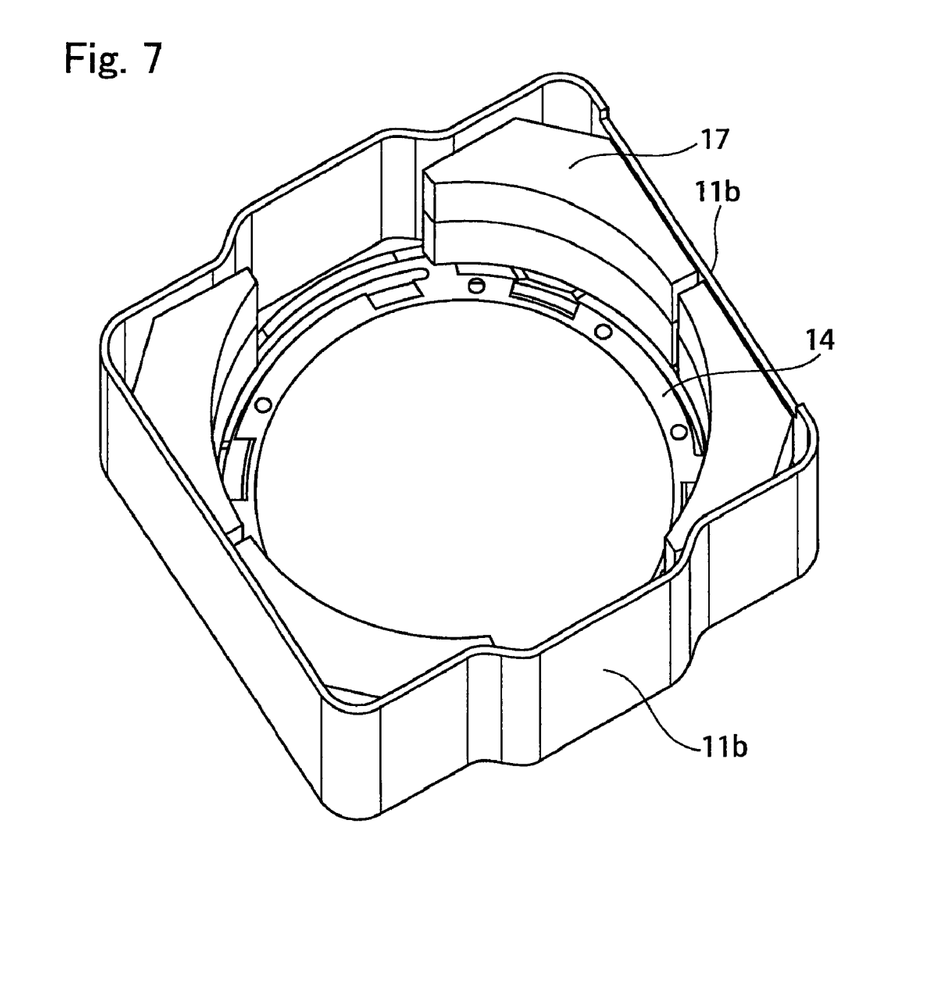
FIG. 7 is a perspective view showing a state where, after a spacer and a first flat spring have been placed, a magnet is mounted on the yoke shown in FIGS. 3(a) and 3(b).

Steps for assembling the lens drive device 1 with the use of the above-mentioned yoke 11 will be described below. FIG. 4 is a flow chart for explaining schematic assembling steps for the lens drive device 1. FIG. 5 is a perspective view showing a state where the spacer 12 has been placed on the yoke 11 shown in FIGS. 3(a) and 3(b) (step S2 in FIG. 4). FIG. 6 is a perspective view showing a state where the spacer 12 and the first flat spring 14 have been placed on the yoke 11 shown in FIGS. 3(a) and 3(b) (step S3 in FIG. 4). FIG. 7 is a perspective view showing a state where, after the spacer 12 and the first flat spring 14 have been placed, the magnet 17 is mounted on the yoke 11 shown in FIGS. 3(a) and 3(b) (step S4 in FIG. 4). The assembling steps shown in FIG. 4 may be performed mechanically or may be performed by hand.

In FIG. 4, first, the yoke 11 whose rear side is directed to the upper side is placed on a work bench (step S1). Specifically, as shown in FIG. 3(b), the yoke 11 is placed in a reverse state so that the cover part 11a, i.e., the upper face in the optical axis direction (front side face) is a bottom face. Next, the spacer 12 is placed on the inside of the yoke 11 (step S2). Specifically, the spacer 12 is placed as shown in FIG. 5. In this case, an adhesive may not be used. Further, at the time of placing, positioning in the radial direction with respect to the optical axis "L" is simultaneously performed by the case part 11b of the yoke 11. In addition, at the time of placing, positioning in the optical axis direction is simultaneously performed by the cover part 11a of the yoke 11. In this embodiment, two directions, i.e., "X" direction and "Y" direction in FIG. 2 which are perpendicular to the optical axis direction are defined as two directions as described in the drawing. A length in the "X" direction between side end faces from an "a" face to an "a'" face, and a length in the "X" direction between side end faces from a "b" face to a "b'" face, which are located at four corners of the spacer 12, are set to be equal to a length in the "X" direction from an "A" face to an "A'" face of the inner face of the case part 11b of the yoke 11 shown in FIG. 3(b). Similarly, a length in the "Y" direction between side end faces from a "c" face to a "c'" face, and a length in the "Y" direction between side end faces from a "d" face to a "d'" face, which are located at four corners of the spacer 12, are set to be equal to a length in the "Y" direction from a "C" face to a "C'" face and a length in the "Y" direction from a "D" face to a "D'" face of the inner face of the case part 11b of the yoke 11 shown in FIG. 3(b). Therefore, when the spacer 12 is placed on the inside of the yoke 11, the spacer 12 is positioned with respect to the yoke 11. In other words, the position in the radial direction of the spacer 12 is determined with respect to the optical axis "L". Further, an upper face 12Z face which is a face on the cover part 11a side of the spacer 12 is abutted with an under face of the cover part 11a of the yoke 11 without a space and thus, when placed on the under face of the cover part 11a, the position in the optical axis direction of the spacer 12 is determined. In this embodiment, the position of the spacer 12 is determined by using the side end faces which are disposed at four corners of the spacer 12 and the inner face of the case part 11b of the yoke 11. However, the above-mentioned two members may be positioned by using other faces, for example, by using center portions.

Next, the first flat spring 14 is mounted on the spacer 12 (step S3). Specifically, as shown in FIG. 6, the spacer side mounting part of the first flat spring 14 is attached by utilizing a pin 12P which is provided at a predetermined position of the spacer 12 through an adhesive. In other words, in the step S3, the position in the radial direction of the spacer 12 is determined by the yoke 11 and then the flat spring 14 is fixed to the spacer 12 with the pin 12P provided at a predetermined position of the spacer 12 as a reference. Further, the pin 12P is provided at four corner positions of the spacer 12 respectively and thus positioning in the radial direction of the flat spring 14 is simultaneously performed with respect to the optical axis "L" at the same time when the flat spring 14 is mounted. In this embodiment, the yoke 11 and the flat spring 14 are positioned each other through the pins 12P provided on the spacer 14. However, the flat spring 14 may be positioned with respect to the yoke 11 similarly to the positioning of the spacer 12 with respect to the yoke 11.

Next, the magnet 17 is mounted on the first flat spring 14 (step S4). Specifically, the magnet 17 is mounted as shown in FIG. 7. In this case, positioning in the radial direction of the magnet 17 is simultaneously performed by the case part 11b of the yoke 11 at the time when the magnet 17 is mounted. In other words, the side face 17X of the magnet 17 is abutted with the inner side face, i.e., "N" face of the case part 11b of the yoke 11 and the side face 17Y is abutted with the inner side face, i.e., "D" face of the yoke 11. Since a corner part 17S is formed between the side faces 17X and 17Y of the magnet 17, even when four corners on the inner side of the yoke 11 is provided with an "R" part to the extent that the "R" part does not contact with the corner part 17S, instead of being formed with a perpendicular portion, two faces, i.e., the side faces 17X and 17Y of the magnet 17 are abutted with the inner face of the yoke and thus positioning in the radial direction is performed surely. In this description, only one of the magnets has been described, in other words, the magnet facing the coil 181 on an object to be photographed side (front side) of the magnets, which are disposed on the upper and lower sides at four corners, has been described. Other magnets which are located at other positions are similarly abutted with the inner face of the yoke 11.

As described above, in the series of the steps, i.e., the step S1 through the step S4, positioning in the optical axis direction and the radial direction are performed by the cover part 11a and the case part 11b of the yoke 11 and thus manufacturing steps with a high degree of working efficiency are obtained.

On the other hand, the coil 18 is wound around the sleeve 13 (step S5), a sleeve side mounting part of the second flat spring 15 is attached to the rear side end face of the sleeve 13 (step S6) and the holder 19 is attached to the sleeve 13 so as to sandwich the second flat spring 15 (step S7). As a result, a sleeve assembly is completed (step S8). The sleeve assembly is inserted from the rear side of the yoke 11 (step S9).

Finally, a wire spring 16 is put into the yoke 11 from the incident window 111 (front side) of the cover part 11a (step S10). Therefore, in the lens drive device 1 in accordance with this embodiment, a diameter of the incident window 111 (and the incident window 121 of the spacer 12) is set to be larger than a diameter of the wire spring 16. Accordingly, the wire spring 16 can be put in a final stage of the assembling steps (see FIG. 4) and, as a result, a degree of freedom for assembling work can be enhanced. Further, since the wire spring 16 can be easily put in through the incident window 111 of the cover part 11a, even when a sudden design modification is required (for example, due to demand by a customer), the demand can be rapidly coped with. In this embodiment, a diameter of the incident window 111 is set to be larger so that the wire spring 16 can be put in through the incident window 111. However, the spacer 12 whose thickness is thicker than a moving amount of the first flat spring 14, in other words, the spacer 12 whose thickness is thicker than a moving amount in the optical axis direction of the movable body (sleeve 13) is disposed between the cover part 11a and the flat spring and thus, even when the movable body is moved to a maximum amount, the movable body can be prevented from projecting from the cover part 11a. Further, when the wire spring 16 is not required, a diameter of the incident window 111 may be made smaller. In this case, even when the movable body (sleeve 13) is moved to a maximum amount, the movable body is prevented from abutting with the cover part 11a by means of that the spacer 12 whose thickness is thicker than a moving amount of the first flat spring 14 is placed.

As described above, when the lens drive device 1 in accordance with this embodiment is to be assembled, the spacer 12 whose thickness is thicker than the moving amount of the first flat spring, the first flat spring 14, and the magnet 17 which is to be fixed to the case part 11b are disposed on an inner side of the cover part 11a of the yoke 11 so as to be sequentially superposed on each other in this order from the cover part 11a. Therefore, the spacer 12 and the first flat spring 14 are positioned by the case part 11b and thus working efficiency can be enhanced. In other words, in this embodiment, since the yoke 11 which is structured so that the cover part 11a and the case part 11b are integrally formed of each other is formed by drawing working, the yoke 11 is formed with a high degree of working accuracy. Therefore, when the spacer 12, the first flat spring 14 and the magnet 17 are disposed in this order along the inner peripheral face of the case part 11b, positional accuracy in the radial direction is secured. Similarly, when the above-mentioned structural elements are superposed on each other with the cover part 11a as a reference face, positioning in the optical axis direction is easily performed.

[Basic Operation]

In the lens drive device 1 in accordance with this embodiment, the movable body is normally located on an imaging element side (image side at a non-energized time of the first coil 181 and the second coil 182). In this case, the wire spring 16 restricts displacement of the movable body by a magnetic attraction force acting between the magnet 17 and the wire spring 16. However, a distance between the wire spring 16 and the magnet 17 is maintained to some extent and thus the magnetic attraction force between the wire spring 16 and the magnet 17 does not become too strong. According to this structure, the center axis of the movable body is prevented from being displaced and, as a result, deterioration of tilt characteristics can be prevented.

In this state, when a current is supplied to the first coil 181 and the second coil 182, upward (front side) electro-magnetic forces are respectively applied to the first coil 181 and the second coil 182. Therefore, the first coil 181, the second coil 182 and the sleeve 13 begin to move to an object to be photographed side (front side).

In this case, elastic forces which restrict movement of the sleeve 13 are respectively occurred between the first flat spring 14 and the front end of the sleeve 13 and between the second flat spring 15 and the rear end of the sleeve 13. Therefore, when the electro-magnetic force for moving the sleeve 13 to the front side and the elastic forces which restrict the movement of the sleeve 13 are balanced with each other, the sleeve 13 is stopped. Further, when a current in a reverse direction is supplied to the first coil 181 and the second coil 182, downward (rear side) electro-magnetic forces are respectively applied to the first coil 181 and the second coil 182.

In this case, the sleeve 13 (movable body) can be stopped at a desired position by means of that a current amount supplied to the first coil 181 and the second coil 182 and elastic forces acting on the sleeve 13 of the first flat spring 14 and the second flat spring 15 are adjusted. In this embodiment, since the sleeve 13 is stopped by utilizing the balance of the electro-magnetic force with the elastic force, different from a case that two members are abutted with each other such that the sleeve 13 is engaged with an engaging part or the like, occurrence of collision noise can be prevented.

Principal Effects of Embodiment

According to the lens drive device 1 in accordance with this embodiment, the yoke 11 is formed in a roughly box-like shape (see FIGS. 3(a) and 3(b)), which is structured so that the cover part 11a and the case part 11b are formed in an integral manner and, when the spacer 12, the first flat spring 14, the magnet 17 and the like are to be accommodated in the yoke 11, positioning in the optical axis direction is performed by the cover part 11a and positioning in the radial direction is performed by the case part 11b. Therefore, even when a conventional positioning jig is not used, respective structural elements such as the spacer 12, the first flat spring 14 and the like can be positioned and, as a result, the number of times of positioning work is reduced and working efficiency can be improved.

Further, the yoke 11 is comprised of one member which is formed by a drawing work and thus a dimensional tolerance is restrained smaller in comparison with a conventional bending work and a structural member with a high degree of working accuracy can be easily formed.

Further, since the spacer 12 and the first flat spring 14 are sandwiched by the cover part 11a and the magnet 17 (see FIG. 7), the spacer 12 and the first flat spring 14 are capable of being positioned in the optical axis direction and thus working efficiency can be enhanced.

Modified Embodiment

Figure 8A:
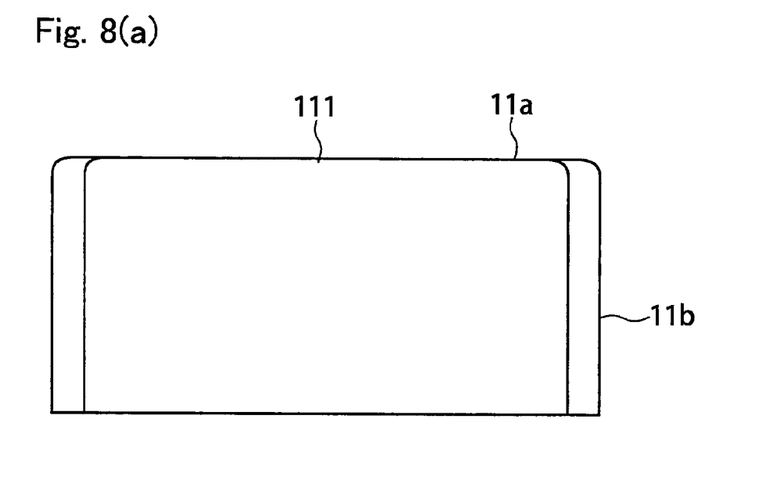
FIGS. 8(a), 8(b) and 8(c) are views for explaining a yoke in a lens drive device in accordance with another embodiment of the present invention.
Figure 8B:
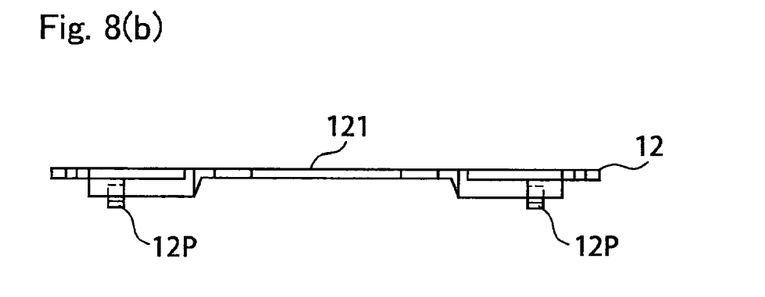
Figure 8C:
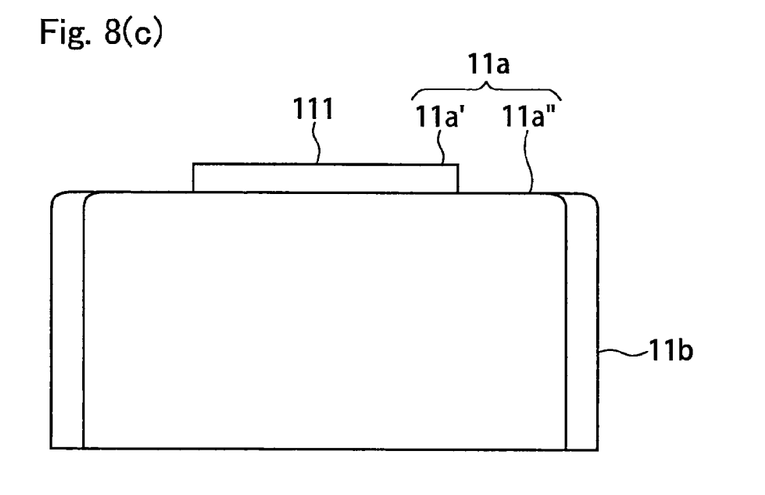

FIGS. 8(a), 8(b) and 8(c) are views for explaining a yoke 11 in the lens drive device 1 in accordance with another embodiment of the present invention. FIG. 8(a) and FIG. 8(b) are views showing the above-mentioned embodiment. Further, FIG. 8(a) and FIG. 8(b) are side views when viewed in the direction of the arrow "X" in FIG. 2.

As shown in FIG. 8(c), a cover part 11a of the yoke 11 is formed so that a portion around an incident window 111 is protruded to an outer side in the optical axis "L" direction and a stepped part is formed with an upper face 11a' and a lower face 11a". When a space is secured by the upper face 11a' and the lower face 11a" as described above, the space is capable of functioning as the spacer 12 shown in FIG. 8(b). In addition, the stepped part structured by the upper face 11a' and the lower face 11a" is, similarly to the above-mentioned embodiment, formed by a drawing work and thus working is easy and working accuracy can be enhanced.

Therefore, when the cover part 11a of the yoke 11 is structured of the upper face 11a' and the lower face 11a" as shown in FIG. 8(c), the spacer 12 may be eliminated and thus the lens drive device 1 can be made thinner or its weight can be reduced.

When the spacer 12 is used as the embodiment described above, the spacer 12 may be formed in any shape. For example, the spacer 12 may be formed in one-plate shape or in a separate shape which is disposed at four corners. In the latter case, the weight of the lens drive device 1 can be reduced in comparison with a case where the one-plate shaped spacer 12 is used.

Further, the lens drive device 1 may be mounted on various electronic apparatuses in addition to a cell phone with a camera. For example, the lens drive device 1 may be mounted on a PHS, a PDA, a bar code reader, a thin digital camera, a monitor camera, a camera for confirming the rear side of a vehicle, a door having an optical authentication function and the like.

At least an embodiment of a lens drive device in accordance with the present invention is effective to enhance working efficiency for positioning.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A lens drive device for use with a lens to photograph or image an object to be photographed or imaged, the lens drive device comprising:
   a movable body which holds the lens and which is movable in an optical axis direction;
   a support body which supports the movable body through a spring member;
   a magnet for moving the movable body in the optical axis direction; and
   a coil which is attached to the movable body for moving the movable body in the optical axis direction;
   wherein the support body comprises a yoke to which the magnet is fixed for moving the movable body in the optical axis direction;
   wherein the yoke is formed by a drawing work so that the yoke comprises:
      a cover part which is formed with an incident window for taking reflected light from the object to be photographed or imaged into the lens and which is exposed as a front face of the lens drive device; and
      a case part which covers a periphery of the movable body and which is exposed as a side face of the lens drive device;
   wherein the cover part and the case part are formed in an integral manner, and
   wherein the lens is driven to move in the optical axis direction for forming an image of the object to be photographed or imaged.

2. The lens drive device according to claim 1, wherein a spacer for mounting the spring member, the spring member, and the magnet which is fixed to the case part are disposed in an inner side of the cover part so as to be superposed on each other in this order from a cover part side.

3. The lens drive device according to claim 2, wherein
   the spacer is abutted with an inner face of the case part to determine a position of the spacer in a direction perpendicular to the optical axis direction, and
   a position of the spring member in the direction perpendicular to the optical axis direction is determined with respect to the yoke through the spacer.

4. The lens drive device according to claim 2, wherein
   a face on a cover part side of the spacer is abutted with an inner face of the cover part to determine a position of the spacer in the optical axis direction, and
   a position of the magnet in the optical axis direction is determined with respect to the yoke through the spacer and the spring member.

5. The lens drive device according to claim 4, wherein
   an external shape of the yoke is formed in a roughly rectangular shape having four corner portions, and
   the magnet is formed with two side faces which are respectively abutted with two inner side faces formed on the corner portion of the yoke, and
   the two side faces of the magnet are respectively abutted with two inner side faces of the yoke to determine a position of the magnet in a direction perpendicular to the optical axis direction on the corner portion of the yoke.

6. The lens drive device according to claim 4, wherein
   the spacer is abutted with an inner face of the case part to determine a position of the spacer in a direction perpendicular to the optical axis direction, and
   a position of the spring member in the direction perpendicular to the optical axis direction is determined with respect to the yoke through the spacer.

7. The lens drive device according to claim 1, wherein a portion around the incident window of the cover part is protruded to an outer side in the optical axis direction to form a stepped part.

* * * * *